United States Patent
Choi et al.

(10) Patent No.: US 7,643,461 B2
(45) Date of Patent: Jan. 5, 2010

(54) METHOD AND TELECOMMUNICATION SYSTEM FOR APPOINTING FREQUENCY ASSIGNMENT MODE AND/OR BROADCAST/MULTICAST SERVICE ASSIGNMENT RATION FOR PROVIDING BROADCAST/MULTICAST SERVICE

(75) Inventors: Jintae Choi, Seoul (KR); Jaemoon Lee, Seoul (KR); Namgyu Kim, Uiwang-si (KR); Beyongsu Kim, Seoul (KR); Sangchoon Jeon, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 215 days.

(21) Appl. No.: 10/578,102

(22) PCT Filed: Nov. 5, 2004

(86) PCT No.: PCT/KR2004/002857

§ 371 (c)(1),
(2), (4) Date: Jan. 31, 2007

(87) PCT Pub. No.: WO2005/046088

PCT Pub. Date: May 19, 2005

(65) Prior Publication Data

US 2007/0217387 A1 Sep. 20, 2007

(30) Foreign Application Priority Data

Nov. 5, 2003 (KR) ...................... 10-2003-0078066

(51) Int. Cl.
*H04W 4/00* (2009.01)
(52) U.S. Cl. ........................ 370/341; 455/450; 455/464

(58) Field of Classification Search ................. 370/341, 370/437
See application file for complete search history.

(56) References Cited

U.S. PATENT DOCUMENTS

| | | |
|---|---|---|
| 2001/0030956 A1 | 10/2001 | Chillariga |
| 2002/0037726 A1 | 3/2002 | Czaja |
| 2002/0085523 A1 | 7/2002 | Kim et al. |
| 2003/0054807 A1* | 3/2003 | Hsu et al. ................... 455/414 |
| 2003/0157899 A1* | 8/2003 | Trossen et al. ................ 455/69 |
| 2003/0227897 A1 | 12/2003 | Okada |
| 2008/0019322 A1* | 1/2008 | Chang et al. ................ 370/333 |

* cited by examiner

*Primary Examiner*—Rafael Pérez-Gutiérrez
*Assistant Examiner*—Marcos Batista
(74) *Attorney, Agent, or Firm*—Lowe Hauptman Ham & Berner, LLP

(57) ABSTRACT

A telecommunication system for appointing a frequency assignment mode and ratio for providing a broadcast/multicast service includes at least one access terminal (AT) for receiving a 1xEV-DO service or the BCMCS through a 1xEV-DO system, a base station manager (BSM) for receiving BCMCS control information containing the FA mode and/or the BCMCS assignment ratio and transmitting the received BCMCS control information to a 1xEV-DO access network controller (ANC), and an access network including a 1xEV-DO access network transceiver subsystem (ANTS) and the 1xEV-DO access network controller for temporarily storing the received BCMCS control information and controlling a sort and/or a ratio of a message, which is transmitted to each access terminal, according to the FA mode and/or the BCMCS assignment ratio contained in the BCMCS control information.

18 Claims, 7 Drawing Sheets

| Field | Working Group | Detailed Description | Completion Schedule |
|---|---|---|---|
| Air-interface | TSG-C(SWG2.5) | Physical Channel : Standard Completion (Except For Framing Issure) | 2003. 12 |
| Security Framework | TSG-S(WG4) | * Completion : Review In Each TSG | 2003. 12 |
| End-to-end Framework | TSG-X BCMCS Ad Hoc | * Draft Version : Review In Each TSG * Open Issue : Framing Issue | 2003. 12 |
| A-interface | TSG-X | Start On July And In Progress | 2004. 06 |
| Packet Network | TSG-X | Progress After Framework Is Completed (IS-835D) | 2004. 06 |

FIG. 2(PRIOR ART)

METHOD AND TELECOMMUNICATION SYSTEM FOR APPOINTING FREQUENCY ASSIGNMENT MODE AND/OR BROADCAST/MULTICAST SERVICE ASSIGNMENT RATION FOR PROVIDING BROADCAST/MULTICAST SERVICE

RELATED APPLICATIONS

This application is a 35 U.S.C. 371 national stage filing of International Application No. PCT/KR2004/002857, filed 5 Nov. 2004, which claims priority to Korean Patent Application No. 2003-78066, filed on 5 Nov. 2003 in Korea. The contents of the aforementioned applications are hereby incorporated by reference.

TECHNICAL FIELD

The present invention relates to a method and a telecommunication system for appointing a frequency assignment (hereinafter, referred to as FA) mode and ratio for providing a broadcast/multicast service (hereinafter, referred to as BCMCS) in a mobile communication system. More particularly, the present invention relates to a method and a telecommunication system in which a radio base station controller appoints an FA mode as a dedicated BCMCS mode or a mixed BCMCS mode or appoints a BCMCS assignment ratio by means of a system parameter in a 1xEV-DO system, thereby efficiently providing a BCMCS.

BACKGROUND ART

Separated medium environments for communication and broadcasting are now being integrated at high speed thanks to the development of information communication technology including a network of multimedia contents and the digitalization and the broadband trend of the network.

As each service provider can easily provide a supplementary service beyond the existing specific service area, border between communication and broadcasting becomes vague, thereby speeding the integration of communication and broadcasting. Such service is referred to as a communication-broadcast integrated service. That is, a communication service provider has pursued the offer of the integrated service in order to provide multimedia contents having higher value added, while a broadcast service provider has made an effort to provide a communication service through a broadcast network and an interactive service overcoming the limitation of conventional uni-directional broadcasting services.

Such a communication-broadcast integrated service may be largely classified into three types of services. A first type of service is a broadcasting service through a communication network such as an Internet broadcasting service, a video on demand (VOD)/music on demand (MOD) service and an electric light board broadcasting service. A second type of service is a communication service through a broadcasting network such as an ultra high speed Internet access service using a cable TV network and an FM paging service using a frequency modulation network and a supplementary service. A third type of service is an integrated service of a communication network and a broadcasting network such as an interactive data broadcasting service, an electronic commerce, a web browsing and a mail service.

In particular, mobile communication and broadcasting has been rapidly integrated according to the bandwidth expansion of a mobile communication network and the development of information communication technology. The integrated service of the mobile communication and the broadcasting may be largely classified into a mobile communication broadcasting service providing a broadcasting function through a mobile communication network and an interactive data broadcasting service using mobile communication.

FIG. 1 is a diagram showing an integrated service according to the integration of mobile communication and a broadcasting service.

According to the wide spread of digital cameras and multifunctional terminals having camcorder functions and the requirement of mobile communication subscribers intended for exchange of music, images, animations, moving pictures, etc., a mobile communication broadcasting service has been developed from a single sentence-centered short message service (hereinafter, referred to as SMS) to a multimedia message service (hereinafter, referred to as MMS). However, in the SMS and the MMS, since data are transmitted between a base station and a terminal by means of a point-to-point scheme, it is difficult to introduce a broadcast concept. In order to improve such a disadvantage, a cell broadcast short message service (hereinafter, referred to as CBS) capable of transmitting the SMS by means of a point-to-multipoint scheme has been developed. Therefore, a broadcast concept has been introduced.

Currently, domestic mobile communication carriers have provided a CBS using a $3^{rd}$ generation partnership project (hereinafter, referred to as GPP) scheme capable of supporting contents of images, voice, or moving pictures of 180 Bytes at maximum. A CBS using a 3GPP2 scheme can support a data transmission speed of 1.23 Kbytes at maximum. However, recently, such a low speed of CBS experiences limitation in providing multimedia application programs. In order to improve such a disadvantage, a trial to provide a broadcasting service of 256 Kbps through an asynchronous multimedia broadcast multicast service (hereinafter, referred to as MBMS) technology and a synchronous BCMCS technology, which use broadcast dedicated channels, has been performed in the 3G mobile communication network.

First, the MBMS is a high speed data broadcasting service in which a plurality of user equipments (hereinafter, referred to as UE) can simultaneously receive data after the data have been transmitted one time. In the MBMS, the 3GPP classifies and defines a broadcast mode and a multicast mode. In the broadcast mode, all subscribers located in a service coverage can be receive a multimedia service, which includes texts, voice, pictures, images, etc., according to setting regarding whether to receive broadcast data through setting of a equipment without a complicated service subscription procedure. In contrast, in the multicast mode, only specific subscribers having joined a corresponding service can receive the service. Therefore, most services are provided with a fee.

Meanwhile, the BCMCS is a service for which standardization is in progress by the $3^{rd}$ GPP2 which is a synchronous researcher group. In the BCMCS, a multimedia service, which includes streaming, texts, pictures, images, etc., is provided to a plurality of users through one link. To provide the multimedia service, a system assigns separate channels or slots for broadcast/multicast and enables many subscribers to simultaneously receive multicast contents.

Further, with the increase of multimedia users and the requirement for a ubiquitous service, the standardization for the BCMCS is in progress in such a manner that the BCMCS is differentiated from the broadcasting service of a satellite digital multimedia broadcasting (DMB) and relates to the conventional multimedia broadcasting service through an high-degree development of a CDMA 2000 1xEV-DO (hereinafter, referred to as 1xEV-DO) network. In particular, a domestic carrier (e.g., SK telecom, KTF, etc) having constructed the 1xEV-DO network, Hitachi and KDDA in Japan, Samsung electronics, Qualcomm Incorporated, etc., insist the necessity of the BCMCS and have actively joined in establishing the standard for the BCMCS.

FIG. 2 is a table showing progress status according to each working group regarding a standardization work for the BCMCS in the 1xEV-DO network.

To provide the BCMCS in the 1xEV-DO network, a service provider appoints an FA through which the BCMCS will be provided and provide the BCMCS through the appointed frequency. However, enormous cost of more than 100 billion won is required for installing one frequency resource. Accordingly, it is preferred to utilize an unused frequency resource of the existing frequency resource. However, since each mobile communication carrier currently does not almost have the unused frequency resource, it is very difficult to efficiently provide the BCMCS.

DISCLOSURE OF THE INVENTION

Therefore, the present invention has been made in view of the above-mentioned problems, and it is an object of the present invention to provide a method and a telecommunication system in which a radio base station controller appoints an FA mode as a BCMCS dedicated or mixed mode or appoints a BCMCS assignment ratio by means of a system parameter in a 1xEV-DO system, thereby efficiently providing a BCMCS.

According to an aspect of the present invention, there is provided communication system for appointing a frequency assignment (FA) mode and/or a broadcast/multicast service (BCMCS) assignment ratio in a 1xEV-DO system in order to provide a BCMCS, the communication system comprising: at least one access terminal (AT) for receiving a 1xEV-DO service or the BCMCS through the 1xEV-DO system; a base station manager (BSM) for receiving BCMCS control information containing the FA mode and/or the BCMCS assignment ratio and transmitting a received BCMCS control information to a 1xEV-DO access network controller (ANC); and an access network including a 1xEV-DO access network transceiver subsystem (ANTS) and the 1xEV-DO access network controller for temporarily storing the received BCMCS control information and controlling a kind and/or a ratio of a message, the message being transmitted to each access terminal, according to the FA mode and/or the BCMCS assignment ratio contained in the BCMCS control information.

According to another aspect of the present invention, there is provided a method for appointing an FA mode and/or a BCMCS assignment ratio in a 1xEV-DO system including at least one access terminal (AT), an access network (AN) and a base station manager (BSM), the access network including a 1xEV-DO access network transceiver subsystem (ANTS) for transmitting packet data and various messages in order to provide a 1xEV-DO service and/or a broadcast/multicast service (BCMCS) to each access terminal and the 1xEV-DO access network controller (ANC), the method comprising the steps of: a) inputting BCMCS control information containing FA mode information and/or BCMCS assignment ratio information and determining whether the information is normal input information or not; b) operating a timer and simultaneously transmitting the BCMCS control information to the access network; c) determining whether a predetermined check time is ended or not and checking whether a response signal is received from the access network or not; and d) outputting an error message and/or a re-input screen of the BCMCS control information when the response signal is not received in the predetermined check time.

According to another aspect of the present invention, there is provided a method for controlling a message according to a broadcast/multicast service (BCMCS) dedicated mode set in a 1xEV-DO system including at least one access terminal (AT), an access network (AN) and a base station manager (BSM), the access network including a 1xEV-DO access network transceiver subsystem (ANTS) for transmitting packet data and various messages in order to provide a 1xEV-DO service and/or a BCMCS to each access terminal and the 1xEV-DO access network controller (ANC), the method comprising the steps of: a) receiving an overhead message transmitted from the access network; b) confirming a CDMA channel list contained in the overhead message, selecting a frequency assignment (FA) and becoming tuned to the frequency assignment; c) determining whether an frequency assignment to which the access terminal is tuned is a BCMCS FA or not when the BCMCS is requested; and d) shifting to the BCMCS FA and receiving the BCMCS FA in a state in which the access terminal is not tuned to the BCMCS FA.

According to another aspect of the present invention, there is provided a method for controlling a message according to a broadcast/multicast service (BCMCS) dedicated mode set in a 1xEV-DO system including at least one access terminal (AT), an access network (AN) and a base station manager (BSM), the access network including a 1xEV-DO access network transceiver subsystem (ANTS) for transmitting packet data and various messages in order to provide a 1xEV-DO service and/or a BCMCS to each access terminal and the 1xEV-DO access network controller (ANC), the method comprising the steps of: a) receiving an overhead message transmitted from the access network; b) confirming a CDMA channel list contained in the overhead message, selects a frequency assignment (FA) and tuning to the frequency assignment; c) checking a stored BCMCS FA when the BCMCS is requested; and d) shifting to the checked BCMCS FA and receiving the BCMCS FA.

According to another aspect of the present invention, there is provided a method for controlling a message according to a broadcast/multicast service (BCMCS) mixed mode set in a 1xEV-DO system including at least one access terminal (AT), an access network (AN) and a base station manager (BSM), the access network including a 1xEV-DO access network transceiver subsystem (ANTS) for transmitting packet data and various messages in order to provide a 1xEV-DO service and/or a BCMCS to each access terminal and the 1xEV-DO access network controller (ANC), the method comprising the steps of: the 1xEV-DO access network controller receiving mixed BCMCS mode information and BCMCS assignment ratio information from the base station manager and storing the received information; controlling a sort and/or a ratio of the message according to the BCMCS assignment ratio information and transmitting the sort and/or the ratio of the message to said each access terminal; periodically checking a ratio of a 1xEV-DO message and determining whether or not the ratio of the 1xEV-DO message exceeds a 1xEV-DO message appointment ratio; selecting at least one shift-targeted access terminal and a specific 1xEV-DO FA according to an exceeding ratio; and transmitting information on the specific 1xEV-DO FA to each shift-targeted access terminal.

BRIEF DESCRIPTION OF THE DRAWINGS

The foregoing and other objects, features and advantages of the present invention will become more apparent from the following detailed description when taken in conjunction with the accompanying drawings in which:

FIG. 2 is a table showing progress status according to each working group regarding a standardization work for a BCMCS in a 1xEV-DO network;

BEST MODE FOR CARRYING OUT THE INVENTION

Figure 1:
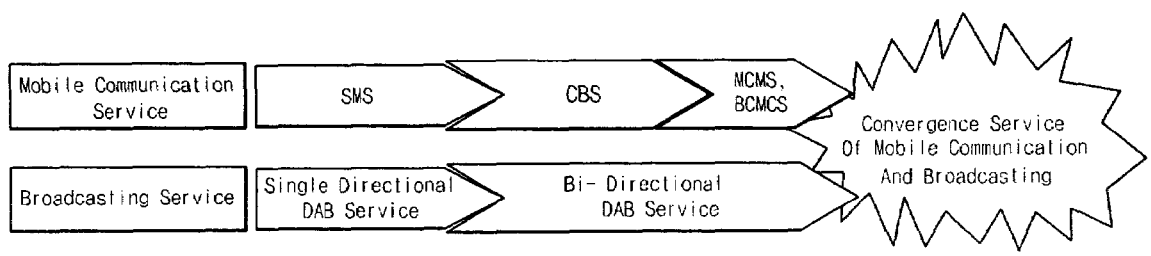
FIG. 1 is a diagram showing an integrated service according to the integration of mobile communication and a broadcasting service.

Reference will now be made in detail to the preferred embodiments of the present invention. The same reference numerals are used to designate the same elements as those shown in other drawings. In the following description of the present invention, a detailed description of known configurations and functions incorporated herein will be omitted when it may make the subject matter of the present invention rather unclear.

Figure 3:
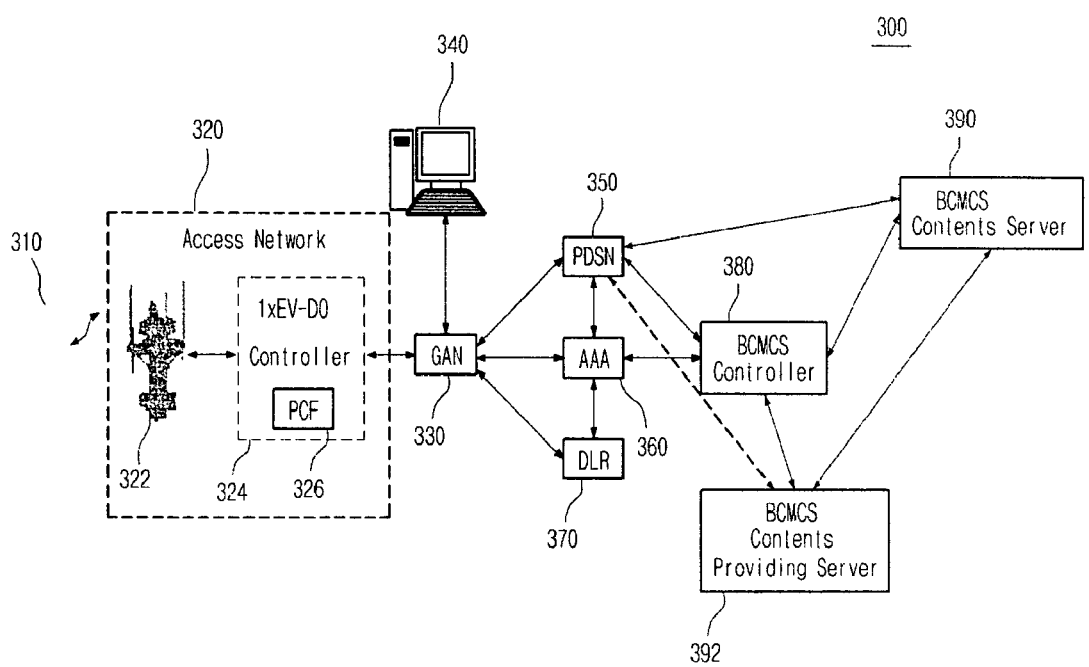
FIG. 3 is a block diagram schematically showing a 1xEV-DO BCMCS system according to a preferred embodiment of the present invention.

FIG. 3 is a block diagram schematically showing a 1xEV-DO BCMCS system 300 according to a preferred embodiment of the present invention.

The 1xEV-DO BCMCS system 300 according to the embodiment of the present invention includes an access terminal (AT) 310, an access network (AN) 320, a general ATM switch network (GAN) 330, a base station manager (BSM) 340, a packet data serving node (hereinafter, referred to as PDSN) 350, an authorization authentication accounting (hereinafter, referred to as AAA) 360, a data location register (DLR) 370, a BCMCS controller 380, a BCMCS contents server 390, a BCMCS contents providing server 392, etc.

The access terminal 310 is a wireless terminal which a user carries and can use for communication and the wireless terminal includes a mobile communication terminal, a notebook computer, a personal digital assistant (PDA), etc. When receiving data, the access terminal 310 uses a forward channel. In contrast, when transmitting data, the access terminal 310 uses a reverse channel. The access terminal 310 has an embedded chip, such as a mobile station modem (hereinafter, referred to as MSM) 4500, an MSM 5500 and an MSM 6500, etc., manufactured by Qualcomm Incorporated in order to use a 1xEV-DO BCMCS.

Meanwhile; in order to use the 1xEV-DO BCMCS according to the embodiment of the present invention, the access terminal 310 performs a service joining application. When the joining application is completed, a subscriber profile is stored in the AAA 360.

The access network 320 includes a 1xEV-DO access network transceiver subsystem (hereinafter, referred to as ANTS) 322 and a 1xEV-DO access network controller (hereinafter, referred to as ANC) 324.

The 1xEV-DO ANTS 322 transmits packet data to the access terminal 310 through air interface. The 1xEV-DO ANTS 322 includes an interface unit for performing a signal matching between the 1xEV-DO ANTS 322 and the 1xEV-DO ANC 324, a CDMA modulation/demodulation unit for performing a modulation function and a demodulation function for a CDMA channel, a radio frequency (RF) unit, etc.

The 1xEV-DO ANC 324 performs a function of controlling the operation of the 1xEV-DO ANTS 322. That is, the 1xEV-DO ANC 324 transmits data sent from the 1xEV-DO ANTS 322 to the packet data serving node 350 through the GAN 330. Further, the 1xEV-DO ANC 324 performs a function of assigning and releasing radio channels for the access terminal 310, controlling the transmission power of the access terminal 310 and a wireless base station, determining a soft handoff and a hard handoff between cells, etc. Furthermore, the 1xEV-DO ANC 324 includes a packet control function (PCF) 326 for transmission of packet data.

Meanwhile, since a CDMA 2000 1x system and a 1xEV-DO system have been used together with each other, the access network 320 may include a base station transceiver subsystem (BTS) and a base station controller (BSC).

The GAN 330 is communication equipment which is connected to the 1xEV-DO ANC 324 and performs a routing function for packet data transmitted/received to/from the 1xEV-DO system. That is, the GAN 330 functions as a switch performing soft handoff for the access terminal 310 connected to a traffic between 1xEV-DO ANCs 324, and interworks with the PCF 326 to provide a packet data service. Further, the GAN 330 performs a function of connecting the packet data serving node 350, the AAA 360 and the data location register 370 for the packet data service.

The base station manager 340 manages the system parameters of the 1xEV-DO ANTS 322 and the 1xEV-DO ANC 324, periodically monitors the operation states of the 1xEV-DO ANTS 322 and the 1xEV-DO ANC 324, etc.

Meanwhile, in order to provide the 1xEV-DO BCMCS according to the embodiment of the present invention, an operator inputs an FA mode appointment command or a BCMCS assignment ratio command by means of the base station manager 340. Accordingly, the base station manager 340 stores a predetermined program (hereinafter, referred to as BCMCS control program) for inputting an FA mode appointment and/or a BCMCS assignment ratio for the BCMCS. Herein, the FA is used as a term identical to a CDMA service channel and a CDMA frequency in a CDMA system.

Further, the FA mode according to the embodiment of the present invention may be appointed as a dedicated BCMCS mode or a mixed BCMCS mode. When the FA mode is appointed as the dedicated BCMCS mode, a corresponding frequency is used only for performing the BCMCS. In contrast, when the FA mode is appointed as the mixed BCMCS mode, the corresponding frequency is used for performing a general 1xEV-DO packet service together with the BCMCS.

In particular, when the FA mode is appointed as the mixed BCMCS mode, the BCMCS control program supports a function of appointing or changing the BCMCS assignment ratio in order to efficiently provide the general 1xEV-DO packet service and BCMCS. For instance, when the BCMCS assignment ratio is set to be 25%, the corresponding frequency is used for providing not only the existing 1xEV-DO service but also the BCMCS. Further, 75% of corresponding frequency capacity is used for providing the existing 1xEV-DO service and the other 25% of the corresponding frequency capacity is used for providing the BCMCS.

When the FA mode and/or the BCMCS assignment ratio is inputted by the operator, etc., corresponding input information is transmitted to the access network 320 through the GAN 330. The 1xEV-DO ANC 324 constituting the access network 320 stores the received input information and then transmits the input information to the 1xEV-DO ANTS 322. Similarly, the 1xEV-DO ANTS 322 stores the received input information. Herein, the input information of the base station manager 340 transmitted to the access network 320 through the GAN 330 is contained in system parameters newly defined for the BCMCS.

Meanwhile, the 1xEV-DO ANC 324 and the 1xEV-DO ANTS 322 adjust contents and ratio of various messages transmitted to the access terminal 310 according to the received and stored FA mode and/or BCMCS assignment ratio. This will be described in detail with reference to FIGS. 4 to 6 later.

The PDSN 350 performs a function of providing a packet data service to the access terminal 310. Further, the PDSN 350 is equipment evolved from an inter-working function (IWF) used for supporting data communication in the 2G mobile communication system.

The AAA 360 performs a subscriber authentication when an authenticated access terminal 310 requests the packet data service. Further, in order to transmit/receive packet data through the PDSN 350, the AAA 360 encodes the data by means of an encoding key, manages an encoding level, collects accounting data for accounting, etc.

In general, the subscriber authentication in the AAA 360 is performed after a terminal authentication has been successfully accomplished in an access network AAA. When the terminal authentication in the access network AAA and the subscriber authentication performed by the AAA 360 have been successfully accomplished, the AAA 360 authorizes a service requested by a subscriber and stores the profile information of the subscriber. Herein, the profile information of the subscriber contains the phone number and the electronic serial number of a mobile communication terminal, information on a joined supplementary service, etc.

The data location register 370 is connected to the 1xEV-DO ANC 324 of the 1xEV-DO system through the GAN 330 by means of a transmission control protocol/Internet protocol (TCP/IP). Further, the data location register 370 manages the position information and the paging zone of the access terminal 310, supports the mobility of the access terminal 310 and controls a session. Herein, the session denotes protocols and a protocol configuration required for communication between the access terminal 310 and the access network 320. Accordingly, for packet data communication between the access terminal 310 and the access network 320, the session must be first generated by the data location register 370.

The BCMCS controller 380 provides the session information of the access terminal 310 to the access terminal 310, the PDSN 350 and the BCMCS contents server 390 and manages the session information. Further, the BCMCS controller 380 receives the subscriber profile from the AAA 360, assigns service authority to the access terminal 310 and authenticates BCMCS contents providers. Furthermore, the BCMCS controller 380 receives BCMCS contents or the list of the BCMCS contents from at least one BCMCS contents providing server 392, and provides contents information to the access terminal 310 so that the access terminal 310 intended for reception of the BCMCS can select the BCMCS contents.

The BCMCS contents server 390 receives or collects the BCMCS contents from at least one BCMCS contents providing server 392, encodes the collected BCMCS contents and stores the encoded BCMCS contents. Further, the BCMCS contents server 390 converts the encoded BCMCS contents into a final IP-based multicast stream and transmits the IP-based multicast stream to the PDSN 350 by means of a multicast transmission technology. Herein, the multicast transmission technology is a transmission technology for simultaneously providing one stream to a plurality of clients and a data transmission technology suitable for a broadcasting service capable of reducing input/output (I/O) of a server and a network bandwidth.

Meanwhile, the access terminal 310 decodes and uses the received encoded BCMCS contents. Further, standardization for a security mechanism for encoding and decoding of the BCMCS contents in the BCMCS is still being discussed. However, since the security mechanism is not contained in the core technology of the present invention, the detailed description will be omitted.

The BCMCS contents providing server 392 provides the BCMCS contents for the BCMCS to the BCMCS contents server 390 by means of a bearer service. Herein, the BCMCS contents provided to the BCMCS contents server 390 from the BCMCS contents providing server 392 is not in an encoded state.

Figure 4:
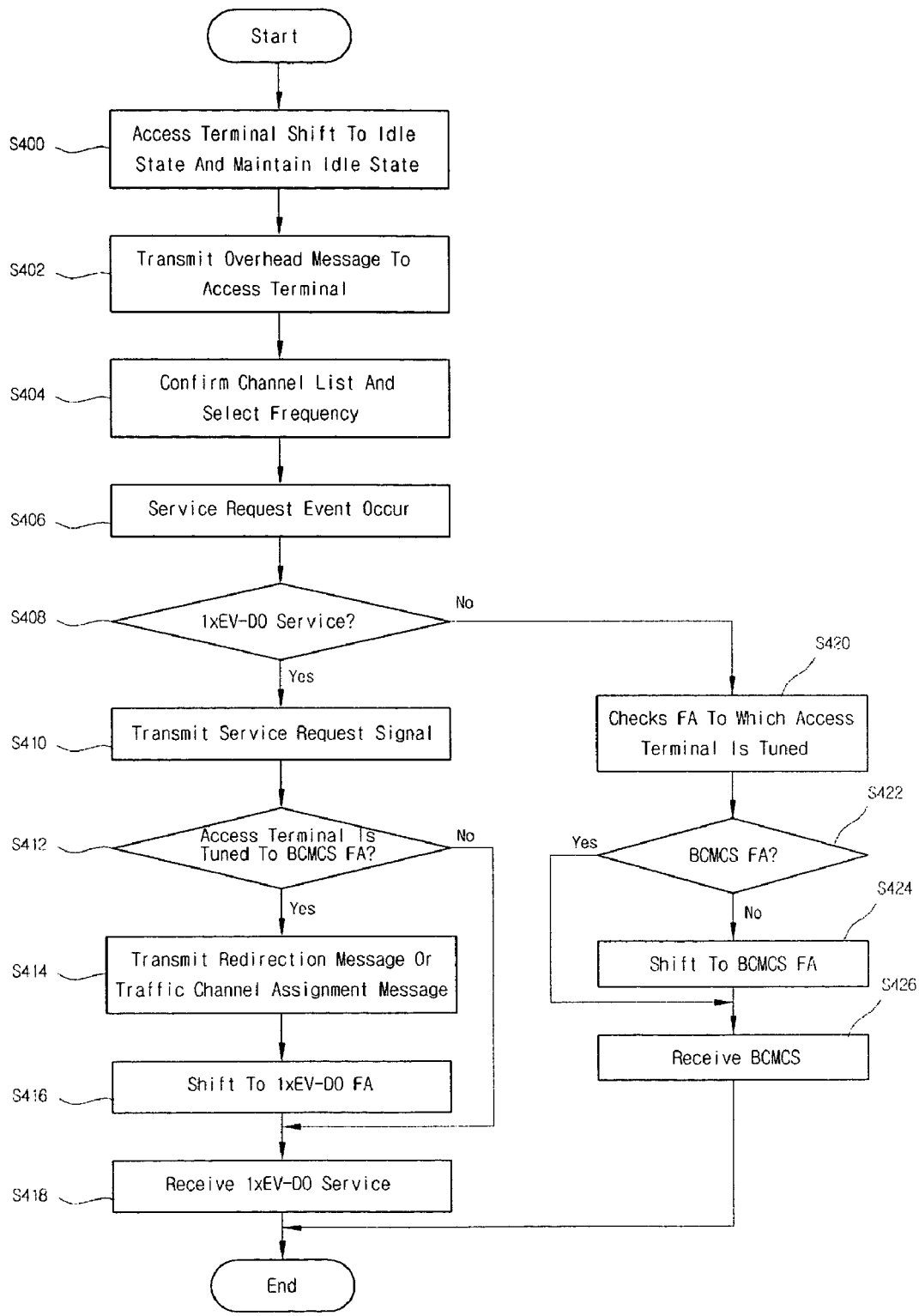
FIG. 4 is a flow diagram illustrating a message processing procedure when an FA mode is appointed as a dedicated BCMCS mode according to a first embodiment of the present invention.

FIG. 4 is a flow diagram illustrating a message processing procedure when the FA mode is appointed as the dedicated BCMCS mode according to a first embodiment of the present invention.

The message processing procedure to be described in FIG. 4 relates to method for processing a message by assigning a 1xEV-DO frequency to some of the access terminal 310 located in the access network 320 controlled by one wireless base station and assigning a BCMCS frequency to the remaining the access terminal 310.

Meanwhile, it is assumed that the access network 320 of the 1xEV-DO system has already stored information on the FA mode and/or the BCMCS assignment ratio transmitted from the base station manager 340.

Further, it is assumed that successful initialization of the access terminal 310 has been already accomplished for the 1xEV-DO system. In the initialization, the access terminal 310 is powered on and information necessary for the access terminal 310 is set, so that conditions required for shifting the access terminal 310 to an idle state are established. The initialization work is performed in a sequence of a system determination sub-state, a pilot channel acquisition sub-state, a sync channel acquisition sub-state, etc. Since the initialization work of the access terminal 310 has been known to those skilled in the art, the detailed description will be omitted.

The access terminal 310 having performed the initialization work shifts to the idle state and periodically detects a control channel in order to receive a message transmitted from the 1xEV-DO system (S400). The access network 320 of the 1xEV-DO system in the dedicated BCMCS mode generates an overhead message and transmits the overhead message to the access terminal 310 (S402). Herein, the overhead message is a message unconditionally received in all access terminals and important system information is contained in a quick_config message, a sector_parameter message, etc.

In the sector_parameter message of the overhead message according to the first embodiment of the present invention, information on two or more FAs is contained in a CDMA channel list. That is, when the access network 320 uses two FAs, the information on the two FAs is contained in the CDMA channel list. Further, when the access network 320 uses three FAs, the information on the three FAs is contained in the CDMA channel list. In particular, one of the information on two or more FAs is information on a BCMCS FA.

The access terminal 310 having received the overhead message confirms the number of CDMA channel lists contained in the sector_parameter message, selects a specific FA by means of an embedded Hash function and is tuned to the specific FA (S404). Herein, the Hash function is a function used for equalizing a frequency resource on probability and is a one-way function. Further, the Hash function is not performed in a reverse direction.

When a plurality of access terminals select specific FAs by means of the Hash function, some access terminals are tuned to the BCMCS FA and other access terminals are tuned to a 1xEV-DO FA. That is, when the information on the two FAs has been contained in the CDMA channel list, the half of the access terminals located in the specific access network 320 are tuned to the 1xEV-DO FA and the remaining half of the access terminals are tuned to the BCMCS FA.

Then, when the user, etc., of the access terminal 310 presses a specific key button provided with the access terminal 310, a service request event occurs (S406).

When the service request event occurs, the access terminal 310 determines whether a requested service is a 1xEV-DO service or a BCMCS (S408). As a result of the determination in step S408, when it is determined that the requested service is the 1xEV-DO service, the access terminal 310 generates a 1xEV-DO service request signal and transmits the 1xEV-DO service request signal to the access network 320 (S410). Then, the 1xEV-DO ANC 324 having received the 1xEV-DO service request signal from the access terminal 310 determines whether the FA to which the access terminal 310 has tuned is the 1xEV-DO FA or the BCMCS FA (S412).

As a result of the determination in step S412, when it is determined that the access terminal 310 are tuned to the BCMCS FA, the 1xEV-DO ANC 324 generates and transmits a redirection message or a traffic channel assignment message (S414). Herein, the redirection message or the traffic channel assignment message stores information on the 1xEV-DO FA to which the access terminal 310 is to shift.

The access terminal 310 having received the redirection message or the traffic channel assignment message shifts to the corresponding 1xEV-DO FA by means of the information on the 1xEV-DO FA contained in the received message (S416). The access terminal 310 having shifted to the new 1xEV-DO FA receives the 1xEV-DO service through the 1xEV-DO system (S418). Meanwhile, as a result of the determination in step S412, when the access terminal 310 are tuned to the 1xEV-DO FA, the 1xEV-DO ANC 324 provides the 1xEV-DO service through the corresponding 1xEV-DO FA.

Meanwhile, as a result of the determination in step S408, when it is determined that the BCMCS has been requested, the access terminal 310 checks the FA to which the access terminal 310 is currently tuned (S420). Then, the access terminal 310 determines whether the FA to which the access terminal 310 is currently tuned is the BCMCS FA or the 1xEV-DO FA (S422). As a result of the determination in step S422, when it is determined that the access terminal 310 is tuned to the 1xEV-DO FA, the access terminal 310 shifts to the BCMCS FA (S424). Then, the access terminal 310 having shifted to the BCMCS FA receives the BCMCS through the 1xEV-DO system (S426). In contrast, as a result of the determination in step S422, when the access terminal 310 is tuned to the BCMCS FA, the access terminal 310 may directly receive the BCMCS through the 1xEV-DO system.

Herein, the access terminal 310 has already stored information on the BCMCS FA having been set to receive the BCMCS. For instance, the information on the BCMCS FA may be stored in the access terminal 310 through a step of manufacturing the access terminal 310 or upgrading the performance of the access terminal 310. Accordingly, the access terminal 310 can confirm the stored information on the BCMCS FA and perform a tuning work to the corresponding BCMCS FA.

Figure 5:
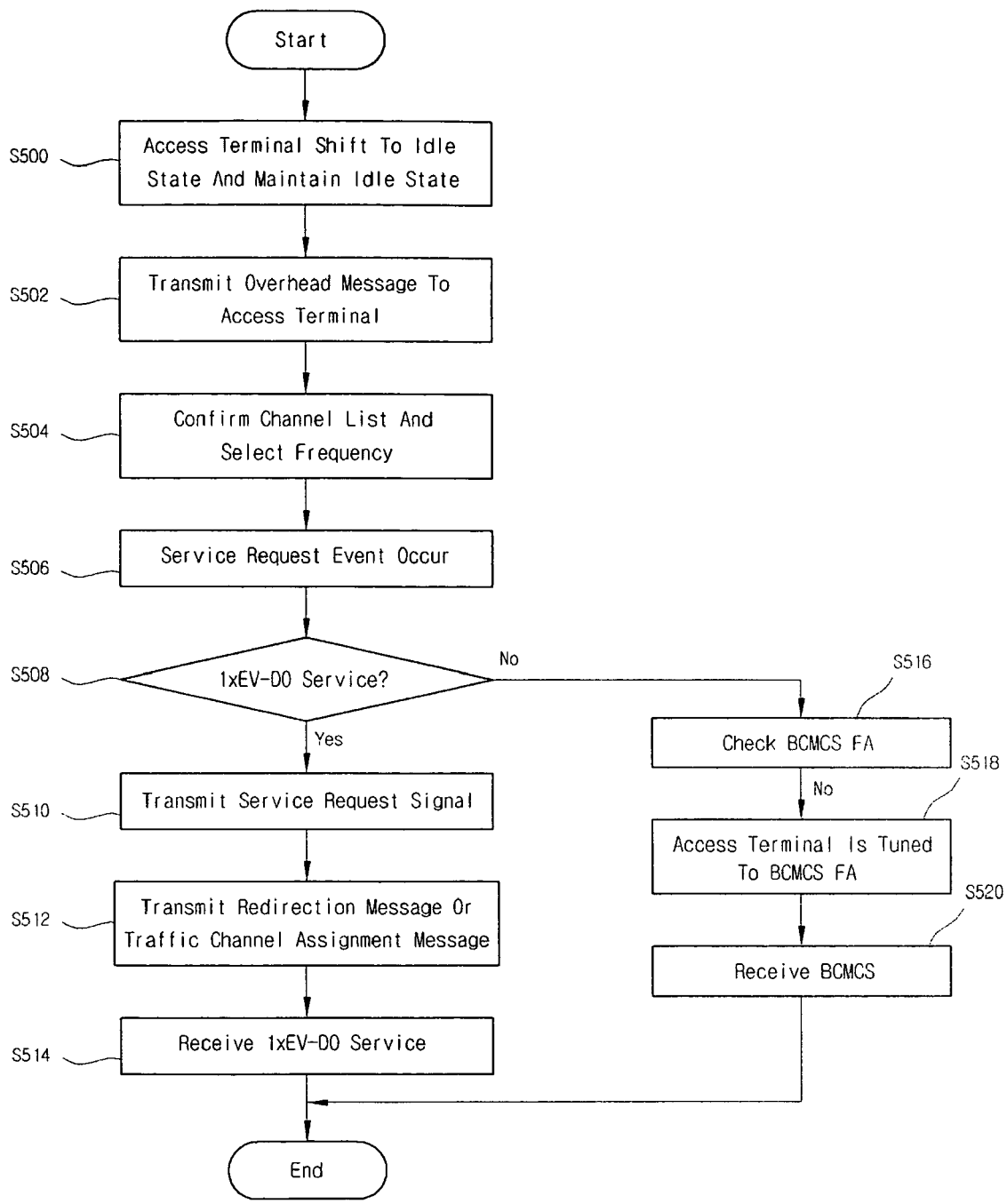
FIG. 5 is a flow diagram illustrating another message processing procedure when an FA mode is appointed as a dedicated BCMCS mode according to a second embodiment of the present invention.

FIG. 5 is a flow diagram illustrating another message processing procedure when the FA mode is appointed as the dedicated BCMCS mode according to a second embodiment of the present invention.

Similarly to the assumption in the description of FIG. 4, it is also assumed that the access terminal 310 has successfully performed the initialization work in FIG. 5. Further, since the descriptions of steps S500, S502, S504, S506 and S508 of FIG. 5 are similar to those of steps S400, S402, S404, S406 and S408 of FIG. 4, the detailed description will be omitted. As described in FIG. 4, the sector_parameter message transmitted in step S402 of FIG. 4 includes the CDMA channel list containing the information on two or more FAs. However, a sector_parameter message transmitted in step S502 of FIG. 5 includes only information on one or more 1xEV-DO FAs. That is, in contrast with step S402 described in FIG. 4, the sector_parameter message does not store information on the BCMCS FA.

Accordingly, the access terminal 310 is not tuned to the BCMCS FA. Instead, the access terminal 310 is tuned to the 1xEV-DO FA. Herein, only when the access terminal 310 requests a BCMCS, the access network 320 transmits a message relating to the BCMCS to the access terminal 310 and provides the BCMCS to the access terminal 310.

Meanwhile, as a result of the determination in step S508, when it is determined that the 1xEV-DO service has been requested, the access terminal 310 generates a 1xEV-DO service request signal and transmits the 1xEV-DO service request signal to the access network 320 (S510). Then, the access network 320 having received the 1xEV-DO service request signal from the access terminal 310 generates a paging message or a traffic channel assignment message and then transmits the paging message or the traffic channel assignment message to the access terminal 310 (S512). The access terminal 310 forms a traffic channel for data reception by means of the received the paging message or the traffic channel assignment message. Then, the access terminal 310 having formed the traffic channel receives the 1xEV-DO service from the 1xEV-DO system (S514).

In contrast, as a result of the determination in step S508, when it is determined that a requested service is the BCMCS, the access terminal 310 confirms stored information on the BCMCS FA (S516). The access terminal 310 having confirmed the stored information on the BCMCS FA is tuned to a corresponding BCMCS FA (S518). Therefore, the access terminal 310 receives the BCMCS (S520).

Figure 6:
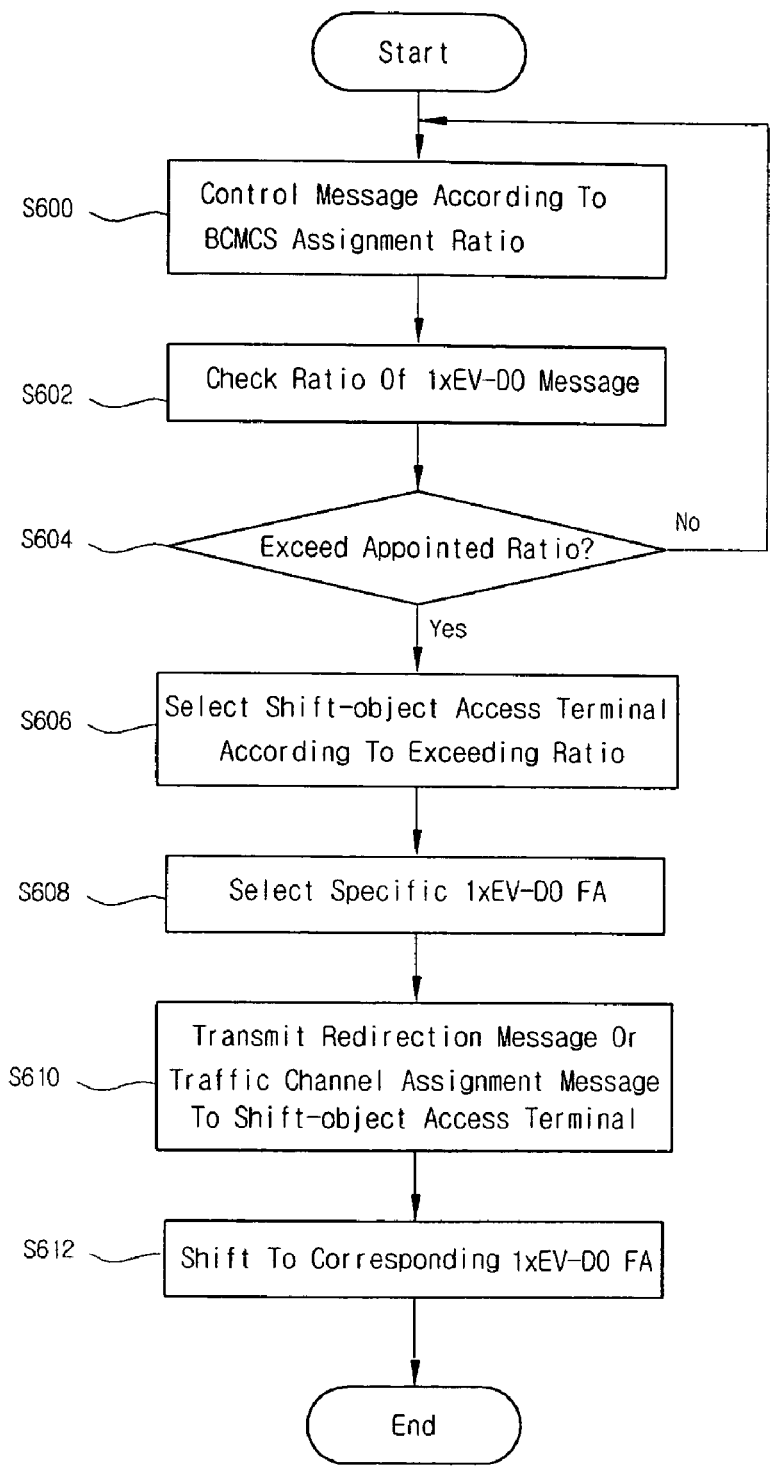
FIG. 6 is a flow diagram illustrating a message processing procedure when an FA mode is appointed as a mixed BCMCS mode according to a third embodiment of the present invention.

FIG. 6 is a flow diagram illustrating a message processing procedure when the FA mode is appointed as the mixed BCMCS mode according to a third embodiment of the present invention.

Similarly to the description of FIGS. 4 and 5, it is assumed that the access terminal 310 has successfully performed the initialization work so as to be in an idle state, and the information on the FA mode and the BCMCS assignment ratio transmitted from the base station manager 340 has been stored in the 1xEV-DO ANTS 322 and the 1xEV-DO ANC 324, in FIG. 6.

The 1xEV-DO ANC 324 controls the transmission of a 1xEV-DO message according to the set BCMCS assignment ratio (S600). Further, the 1xEV-DO ANC 324 periodically checks the ratio of the 1xEV-DO message controlled to be transmitted through the 1xEV-DO ANTS 322 by the 1xEV-DO ANC 324 (S602). Furthermore, the 1xEV-DO ANC 324 periodically determines whether or not the ratio of the 1xEV-DO message, the transmission of which is controlled by the 1xEV-DO ANC 324, exceeds an already appointed BCMCS assignment ratio (S604).

As a result of the determination in step S604, when it is determined that the ratio of the 1xEV-DO message exceeds the already appointed BCMCS assignment ratio, the 1xEV-DO ANC 324 selects an access terminal, which receives a message corresponding to the exceeding ratio from the 1xEV-DO system, as a shift-targeted terminal (S606). For instance, in a state in which the BCMCS assignment ratio is 70% and a general 1xEV-DO service assignment ratio is 30% in the mixed BCMCS mode, when the ratio of a message transmitted/received on air interface for the 1xEV-DO service exceeds 30%, the 1xEV-DO ANC 324 selects an access terminal having received the 1xEV-DO service message from a time point at which the ratio exceeds 30% as a shift-targeted access terminal.

The 1xEV-DO ANC 324 having selected a plurality of shift-targeted access terminals selects a 1xEV-DO FA to be assigned to corresponding shift-targeted access terminals (S608). The 1xEV-DO ANC 324 having selected a specific 1xEV-DO FA generates a redirection message or a traffic channel assignment message containing information on a corresponding 1xEV-DO FA and transmits the redirection message or the traffic channel assignment message to the shift-targeted access terminals (S610). The shift-targeted access terminals, which have received the redirection message or the traffic channel assignment message transmitted from the access network 320, shift to the 1xEV-DO FA contained in the received message and continuously receive the 1xEV-DO service (S612).

Figure 7:
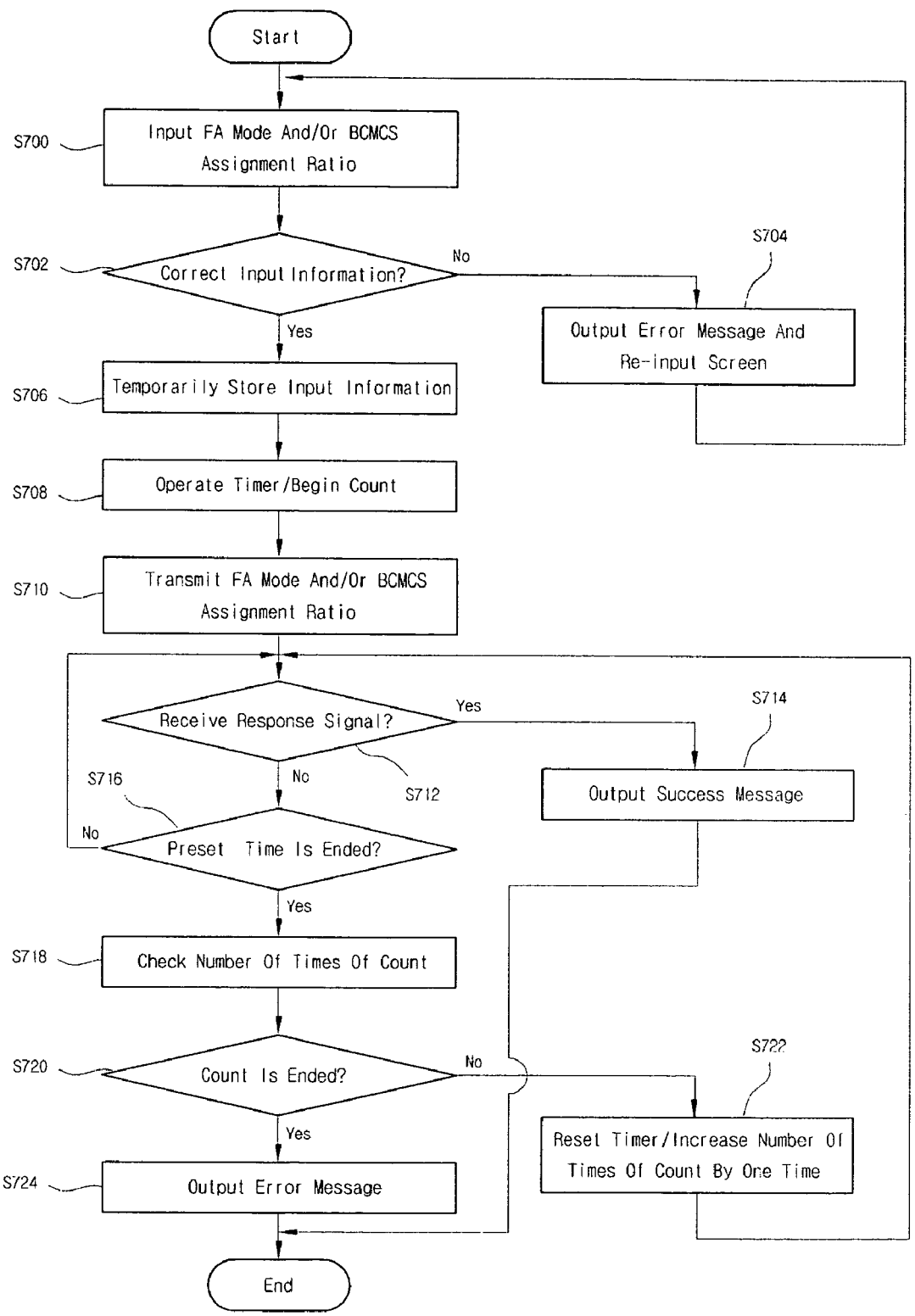
FIG. 7 is a flow diagram illustrating a process of appointing an FA mode and/or a BCMCS assignment ratio according to an embodiment of the present invention.

FIG. 7 is a flow diagram illustrating a process of appointing the FA mode and/or the BCMCS assignment ratio according to an embodiment of the present invention.

First, information on the FA mode and/or the BCMCS assignment ratio is inputted to the base station manager 340 by the operator, etc., of the base station manager 340 (S700). Herein, the information on the FA mode and/or the BCMCS assignment ratio is inputted to the base station manager 340 by means of a data input device (i.e., a key board and a mouse) equipped with the base station manager 340 and the BCMCS control program stored in the base station manager 340.

The BCMCS control program determines whether the inputted information on the FA mode and/or the BCMCS assignment ratio is normal information or not (S702). For instance, when a dedicated BCMCS mode is inputted or selected as an FA mode and the BCMCS assignment ratio is inputted as 50%, the BCMCS control program determines that it is not normal information input. As a result of the determination in step S702, when it is determined that it is not the normal information input, the BCMCS control program outputs an error message and a re-input screen of a FA mode and/or a BCMCS assignment ratio to a monitor, etc (S704).

In contrast, as a result of the determination in step S702, when it is determined that it is normal information input, the BCMCS control program temporarily stores the input information in a data storage device such as a hard disk equipped with the base station manager 340 (S706). Then, the BCMCS control program operates a timer, starts to measure a time and begins a count work (S708). Further, the BCMCS control program starts to measure the time in step S708 and simultaneously transmits the information on the FA mode and/or the BCMCS assignment ratio inputted in step S700 to the 1xEV-DO ANC 324 through the GAN 330 (S710).

The base station manager 340 having transmitted the information on the FA mode and/or the BCMCS assignment ratio determines whether or not a response signal is transmitted from the 1xEV-DO ANC 324 (S712). When receiving the response signal from the 1xEV-DO ANC 324, the base station manager 340 outputs a success message to the monitor, etc., (S714). In contrast, When the base station manager 340 does not receive the response signal from the 1xEV-DO ANC 324, the BCMCS control program determines whether a preset time is ended or not (S716).

For instance, when the base station manager 340 does not normally transmit a system parameter including the information on the FA mode and/or the BCMCS assignment ratio to the 1xEV-DO ANC 324, or the base station manager 340 or the 1xEV-DO ANC 324 processes other works, etc., there may occur a case in which the system parameter including the information on the FA mode and/or the BCMCS assignment ratio is not normally processed.

Meanwhile, as a result of the determination in step S716, when it is determined that the preset time has not been ended, step S712 is performed to allow the BCMCS control program to check again whether the response signal is received from the 1xEV-DO ANC 324 or not. In contrast, as a result of the determination in step S716, when it is determined that the preset time has been ended, the BCMCS control program checks the current number of times of the count (S718). That is, the BCMCS control program stores an algorithm for checking information on the maximum number of times of a count, maximum setting time information in each count step, whether the response signal is received or not in a maximum count, etc. Herein, the BCMCS control program can provide a function capable of changing the maximum number of times of the count, the maximum setting time in each count step, etc.

The BCMCS control program determines whether or not the number of times of the count checked in step S718 is a preset maximum number of times of a count (S720). As a result of the determination in step S720, when it is determined that it is not a count end time point, the BCMCS control program resets the timer and increases the number of times of the count by one time (S722). Then, step S712 is performed to allow the BCMCS control program to check whether the response signal is received from the 1xEV-DO ANC 324 or not. In contrast, as a result of the determination in step S720, when it is determined that it is the count end time point, the BCMCS control program outputs a final error message and a re-input screen of a FA mode and/or a BCMCS assignment ratio to the monitor, etc (S724). Accordingly, the operator, etc., of the base station manager 340 having confirmed the final error message inputs information on the FA mode and/or the BCMCS assignment ratio again. Therefore, the operator of the base station manager 340 can efficiently manage the BCMCS.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

According to the present invention as described above, when a 1xEV-DO system provides a BCMCS, it is unnecessary to install a new frequency resource because a specific frequency resource used in an existing 1xEV-DO system can be utilized. Accordingly, the present invention can obtain economic effect capable of reducing enormous cost required for installing the new frequency resource.

Further, the present invention provides a function of setting a corresponding frequency resource used for a BCMCS as a dedicated BCMCS mode or a mixed mode of a BCMCS and a 1xEV-DO service according to communication environments changing every moment. Accordingly, a network management company can efficiently provide a 1xEV-DO service or a BCMCS through a flexible network management.

The invention claimed is:

1. A communication system for appointing a frequency assignment (FA) mode and/or a broadcast/multicast service (BCMCS) assignment ratio in a 1xEV-DO system in order to provide a BCMCS, the communication system comprising:
    at least one access terminal (AT) for receiving a 1xEV-DO service or the BCMCS though the 1xEV-DO system;
    a base station manager (BSM) for receiving BCMCS control information containing the FA mode and/or the BCMCS assignment ratio and transmitting a received BCMCS control information to a 1xEV-DO access network controller (ANC); and
    an access network including a 1xEV-DO access network transceiver subsystem (ANTS) and the 1xEV-DO ANC for temporarily storing the received BCMCS control information and controlling a message being transmitted to said at least one access terminal, according to the FA mode and/or the BCMCS assignment ratio contained in the BCMCS control information;
    wherein
    the 1xEV-DO ANC is configure for assigning a specific 1xEV-DO FA, from among 1xEV-DO FAs available for the 1xEV-DO service, to the BCMCS according to each access network area in the 1xEV-DO system;
    the FA mode includes a dedicated BCMCS mode where the specific 1xEV-DO FA is allocated exclusively for the BCMCS, and a mixed BCMCS mode where the specific 1xEV-DO FA is allocated to both the BCMCS and the 1xEV-DO service; and
    in the mixed BCMCS mode, the 1xEV-DO ANC is configured for controlling a ratio of (i) a first portion of frequency capacity of the specific 1xEV-DO FA allocated to the BCMCS to (ii) a second portion of frequency capacity of the specific 1xEV-DO FA allocated to the 1xEV-DO in accordance with the BCMCS assignment ratio.

2. The communication system as claimed in claim 1, wherein the frequency capacity of the specific 1xEV-DO FA is allocated to the BCMCS and the 1xEV-DO service in accordance with the received BCMCS assignment ratio.

3. A communication system for appointing a frequency assignment (FA) mode and/or a broadcast/multicast service (BCMCS) assignment ratio in a 1xEVDO system in order to provide a BCMCS, the communication system comprising: at least one access terminal (AT) for receiving a 1xEV-DO service or the BCMCS through the 1xEV-DO system; a base station manager (BSM) for receiving BCMCS control information containing the FA mode and/or the BCMCS assignment ratio and transmitting a received BCMCS control information to a 1xEV-DO access network controller (ANC); and an access network including a 1xEV-DO access network transceiver subsystem (ANTS) and the 1xEV-DO ANC for temporarily storing the received BCMCS control information and controlling a message being transmitted to said at least one access terminal, according to the FA mode and/or the BCMCS assignment ratio contained in the BCMCS control information; wherein the 1xEV-DO ANC is configured for assigning a specific 1xEV-DO FA, from among 1xEVDO FAs available for the 1xEV-DO service, to the BCMCS according to each access network area in the 1xEV-DO system; the FA mode includes a dedicated BCMCS mode where the specific 1xEV-DO FA is allocated exclusively for the BCMCS, and a mixed BCMCS mode where the specific 1xEV-DO FA is allocated to both the BCMCS and the 1xEV-DO service; and in the mixed BCMCS mode, the 1xEV-DO ANC is configured for controlling a ratio of (i) a first portion of frequency capacity of the specific 1xEV-DO FA allocated to the BCMCS to (ii) a second portion of frequency capacity of the specific 1xEV-DO FA allocated to the 1xEV-DO in accordance with the BCMCS assignment ratio.

4. The communication system as claimed in claim 1, wherein the base station manager stores a BCMCS control program performing a function of inputting the BCMCS control information, determining whether the inputted BCMCS control information is correct information or not, inserting the BCMCS control information into the system parameter message, and transmitting the system parameter message to the access network.

5. The communication system as claimed in claim 1, wherein the access network includes a base station controller (BSC) and a base station transceiver subsystem (BTS).

6. The communication system as claimed in claim 1, wherein the 1xEV-DO system further comprises a general ATM switch network (GAN), which is connected to the 1xEV-DO access network controller and performs a routing function for transmitted/received packet data regarding the 1xEV-DO service and/or the BCMCS.

7. The communication system as claimed in claim 1, wherein the 1xEV-DO system further comprises a packet data serving node (PDSN), which is connected to the GAN and performs a function of transmitting the packet data to said at least one access terminal though the GAN.

8. The communication system as claimed in claim 1, wherein the 1xEV-DO system further comprises an authorization authentication accounting (AAA), which is connected to the GAN and the packet data serving node and performs a subscriber authentication when an authenticated access terminal requests a packet data service, encodes the packet data by means of an encoding key in order to transmit the packet data though the packet data serving node, and collects accounting data.

9. The communication system as claimed in claim 1, wherein the 1xEV-DO system further comprises a data location register, which is connected to the 1xEV-DO access network controller through the GAN by means of a transmission control protocol/Internet protocol (TCP/IP) and manages position information and paging zone of said at least one access terminal, supports mobility of at least one access terminal, and controls a session.

10. The communication system as claimed in claim 8, wherein the 1xEV-DO system further comprises a BCMCS controller for providing and managing session information of said at least one access terminal, receiving subscriber profile information from the authorization authentication accounting, and assigning service authority to said at least one access terminal.

11. The communication system as claimed in claim 10, wherein the 1xEV-DO system further comprises a BCMCS contents server for receiving at least one BCMCS contents from at least one BCMCS contents provider, encoding the received BCMCS contents, and storing the encoded BCMCS contents.

12. The communication system as claimed in claim 11, wherein the BCMCS contents server converts the encoded BCMCS contents into an IP-based multicast stream and transmits the IP-based multicast stream to the packet data serving node by means of a multicast transmission technology.

13. The communication system as claimed in claim 11, wherein the 1xEV-DO system further comprises at least one BCMCS contents providing server for transmitting the BCMCS contents to the BCMCS contents server by means of a bearer service.

14. A method of controlling a broadcast/multicast service (BCMCS) in a 1xEV-DO system including a plurality of access terminals (ATs), an access network (AN) and a base station manager (BSM), the access network including (i) a 1xEV-DO access network transceiver subsystem (ANTS) for transmitting packet data and various messages in order to simultaneously provide both a 1xEV-DO service and the BCMCS to one or more of said access terminals, and (ii) a 1xEV-DO access network controller (ANC), the method comprising the following steps performed by the 1xEV-DO ANC:

receiving mixed BCMCS mode information and BCMCS assignment ratio information from the BSM and storing the received information, based on the mixed BCMCS mode information, allocating frequency capacity of a specific 1xEV-DO FA to both the BCMCS and the 1xEV-DO service; and controlling a 1xEV-DO service of messages, which include both the 1xEV-DO service and the BCMCS and are communicated over the specific 1xEV-DO FA, according to a 1xEV-DO message appointment ratio defined by the BCMCS assignment ratio information, wherein said controlling comprises:

periodically determining whether or not the 1xEV-DO service of a message communicated over said specific 1xEV-DO FA exceeds the 1xEV-DO message appointment ratio; and if the 1xEV-DO service of the message exceeds the 1xEV-DO message appointment ratio:

selecting at least one access terminal, which receives the 1xEV-DO service when the 1xEV-DO service of the message exceeds the 1xEV-DO message appointment ratio, as a shift-targeted access terminal;

assigning another 1xEV-DO FA to said shift-targeted access terminal; and providing the 1xEV-DO service on said another 1xEV-DO FA to said at least one shift-targeted access terminal, thereby maintaining the 1xEV-DO service of messages communicated over said specific 1xEV-DO FA at or below the 1xEV-DO message appointment ratio.

15. The method as claimed in claim 14, wherein the BCMCS assignment ratio information contains ratio information for using a BCMCS FA resource, which is appointed for the BCMCS, in the BCMCS mixed mode.

16. The method as claimed in claim 15, wherein the 1xEV-DO message appointment ratio and the BCMCS assignment ratio together define from the entire BCMCS FA resource.

17. The method as claimed in claim 14, wherein the information on said another 1xEV-DO FA is recorded in a redirection message or a traffic channel assignment message and then transmitted to said at least one shift-targeted access terminal.

18. The method as claimed in claim 17, wherein said at least one shift-targeted access terminal having received the redirection message or the traffic channel assignment message shifts to said another 1xEV-DO FA and receives the 1xEV-DO service over said another 1xEV-DO FA instead of said specific 1xEV-DO FA.

\* \* \* \* \*